US006893256B2

(12) United States Patent
Raichle et al.

(10) Patent No.: US 6,893,256 B2
(45) Date of Patent: May 17, 2005

(54) ROTARY KILN WITH ANNULAR, CLOSED END SEAL, ANNULAR, CLOSED SEAL FOR A ROTARY KILN, AND METHOD FOR THE PRODUCTION OF SUCH A SEAL

(75) Inventors: Peter H. Raichle, Dorsten (DE); Harry F. Werner, Essen (DE)

(73) Assignee: Veba Oel Technologie und Automatisierung GmbH (DE)

( * ) Notice: Subject to any disclaimer, the term of this patent is extended or adjusted under 35 U.S.C. 154(b) by 0 days.

(21) Appl. No.: 10/346,992

(22) Filed: Jan. 17, 2003

(65) Prior Publication Data

US 2004/0086821 A1 May 6, 2004

(30) Foreign Application Priority Data

Jan. 17, 2002 (DE) .......................................... 102 01 503

(51) Int. Cl.[7] .................................................. F27B 7/24
(52) U.S. Cl. ...................................... 432/115; 277/590
(58) Field of Search .......................... 432/115; 277/358, 277/390, 391, 590; 29/888.3

(56) References Cited

U.S. PATENT DOCUMENTS

| | | | |
|---|---|---|---|
| 3,976,534 A | | 8/1976 | Walter et al. |
| 4,155,559 A | * | 5/1979 | Sieghartner ................. 277/396 |
| 4,212,477 A | | 7/1980 | Ludwig |
| 4,252,352 A | * | 2/1981 | Scannell ..................... 277/587 |
| 4,813,689 A | | 3/1989 | Stalter et al. |
| 4,932,863 A | * | 6/1990 | Anderson ................... 432/115 |
| 5,221,095 A | * | 6/1993 | Orlowski .................... 277/303 |
| 6,186,510 B1 | * | 2/2001 | Reagan ....................... 277/371 |
| 6,325,381 B1 | * | 12/2001 | von Engelbrechten ...... 277/361 |

FOREIGN PATENT DOCUMENTS

| | | | |
|---|---|---|---|
| DE | 23 38 373 A1 | 4/1975 | |
| DE | 36 44 330 A1 | 7/1988 | |
| DE | 692 10 585 T2 | 1/1992 | |
| DE | 40 35 129 A1 | 5/1992 | |
| DE | 44 33 939 A1 | * 5/1995 | ............ F16J/15/10 |
| DE | 43 43 464 A1 | 6/1995 | |
| EP | 0 741 807 B1 | 11/1996 | |
| WO | WO 92/13217 | 8/1992 | |

* cited by examiner

*Primary Examiner*—Gregory Wilson
(74) *Attorney, Agent, or Firm*—Fay, Sharpe, Fagan, Minnich & McKee, LLP

(57) ABSTRACT

The invention is based on the problem of designing an endless sealing ring for the end wall seal of rotary kilns so that it guarantees a high degree of sealing effectiveness with simpler assembly. The most desired features are small tolerances for cross section and diameter. Rotary-kiln end-wall seals according to the invention should exhibit very low wear and tear if possible and have a service life that corresponds to the maintenance intervals of the rotary kiln as much as possible. This problem is solved for an annular, closed seal for the end seal of a rotary kiln between the rotating tube and the stationary end walls, wherein a core ring has a polygonal, preferably rectangular, cross section with a joint protected from tensile loads and the core ring is surrounded by an endless braid to form the desired final cross section, such that the joint of the core ring is fixed and protected from tension, preferably by tension-relieving threads or fibers extending in the ring circumferential direction and anchored on both sides of the joint.

24 Claims, 3 Drawing Sheets

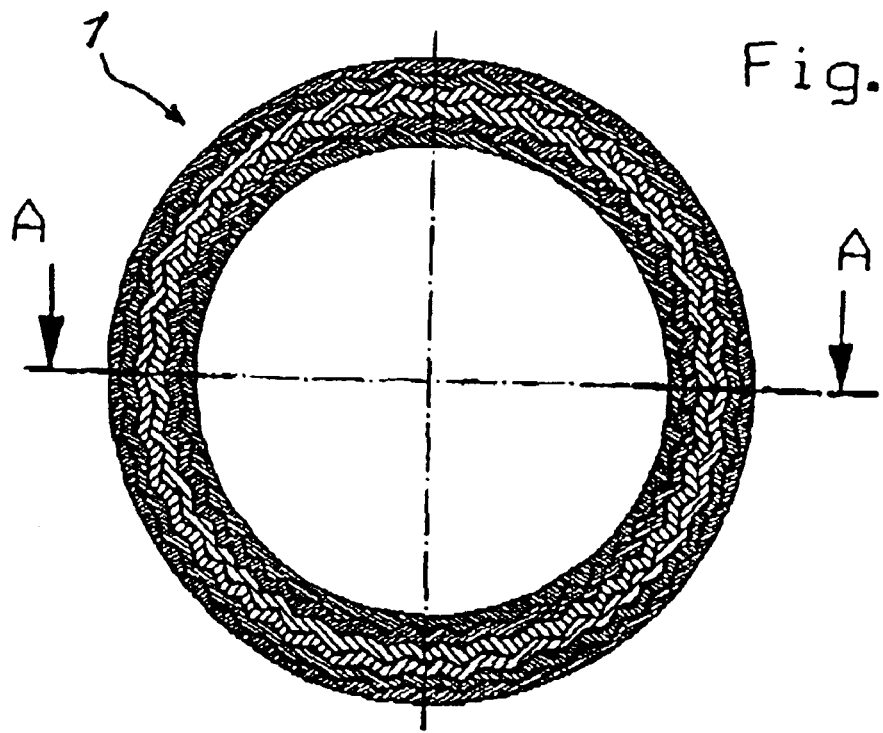
Fig. 1
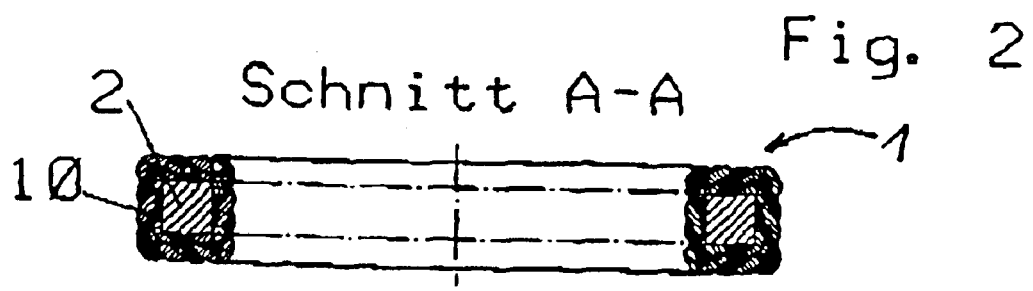
Schnitt A-A    Fig. 2
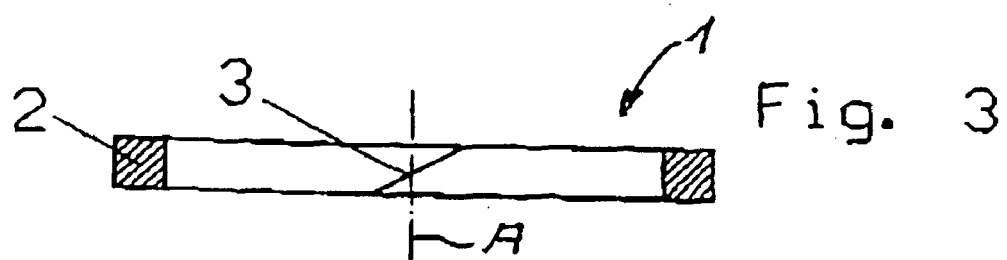
Fig. 3

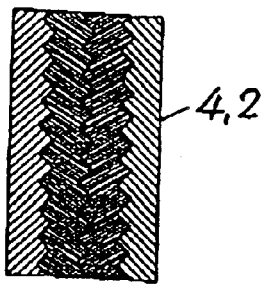
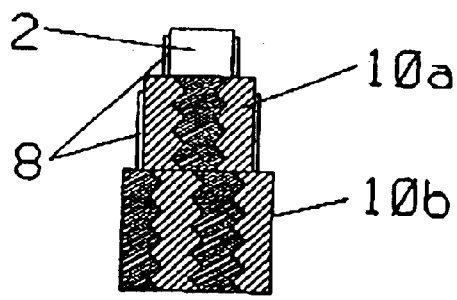
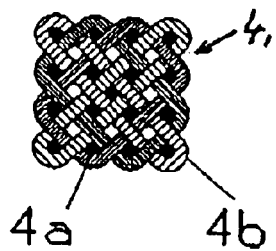
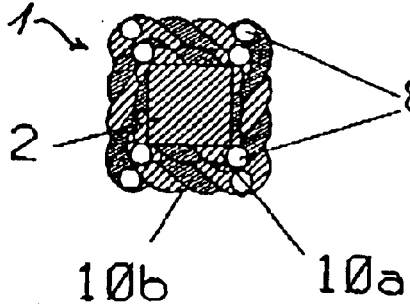
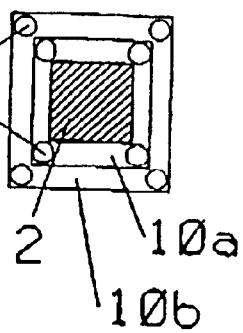
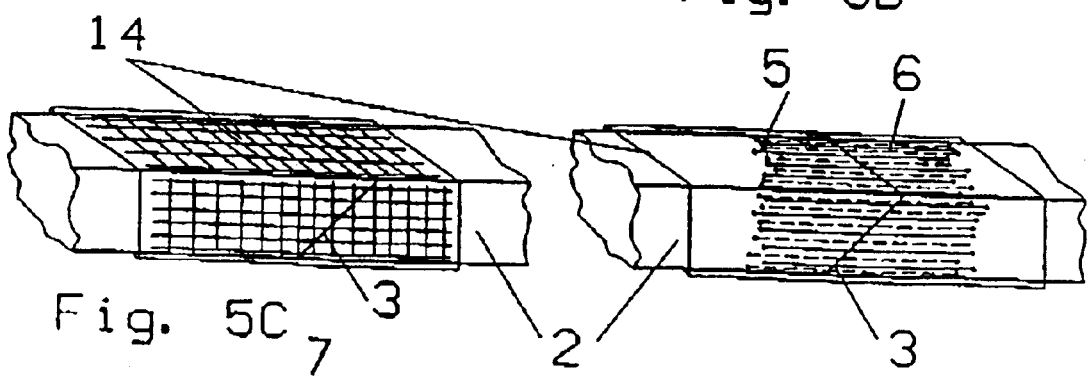
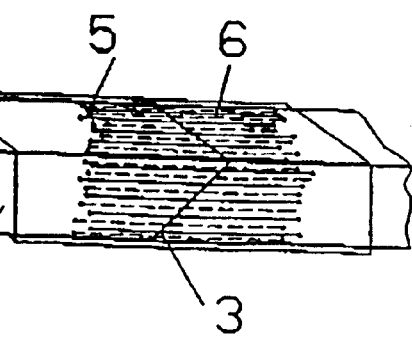
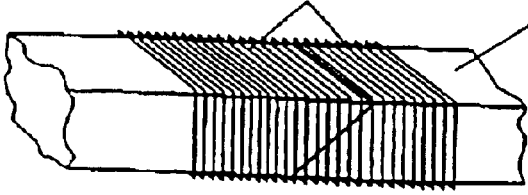

ROTARY KILN WITH ANNULAR, CLOSED END SEAL, ANNULAR, CLOSED SEAL FOR A ROTARY KILN, AND METHOD FOR THE PRODUCTION OF SUCH A SEAL

The invention concerns a rotary kiln with an annular, closed end seal, an annular, closed seal for a rotary kiln, as well as a method for the production of such a seal—according to the preambles of claims 1, 14, and 16.

BACKGROUND ON THE INVENTION

Due to gases that are produced by rotary kilns during many chemical processes and that should not be allowed to mix with the surrounding atmosphere, it is necessary to seal the gap between the rotating, heated kiln tube and the stationary ends containing the inlet or the outlet for the material to be treated in the rotary kiln with sealing rings. This necessity and the problems that have appeared from their practical implementation have already been described in DE 40 35 129 A1 with reference to the changing sealing gap dimensions at the periphery of the seal. This problem was solved with self-centering sealing surfaces, which engage each other with a positive fit and are thus profiled for this purpose.

Because self-centering seals must withstand considerable shear forces, their sealing behavior is less satisfactory in comparison with elastic sealing rings.

The use of comparable elastic seals requires a multi-sided support for the ring seal in a sealing groove, which has a polygonal, usually rectangular, cross section. The insertion of sealing rings in such grooves for holding sealing rings is only relatively problem-free if the sealing rings have very accurate dimensions. Until now, the problem of dimensional accuracy for such sealing rings has only been solved extremely unsatisfactorily, so that instead of annular, closed seals, prefabricated endless sealing cords have been used which are cut to length corresponding to the desired seal circumference. These sealing rings, which do not belong to the present class, have the disadvantage, among other things, that their sealing behavior at the joint is usually unsatisfactory. In addition, problems due to increased wear and tear occur at the joint.

Previous attempts at using sealing rings with polygonal, closed cross sections consisting of a core ring with a joint as well as a cover made from an endless braid have always failed in practice because the closed sealing rings too often deviate in cross section and/or in circumference from the desired dimensions. The associated waste was excessively high.

Endless sealing cords were successful to a certain degree in improving the mechanical strength and especially the shape-retention capability of braided sealing cords. For this purpose, the braid fibers in the polygon corners were made out of a different material than the braid fibers in the middle of the polygon surfaces. For example, elongated PTFE filaments impregnated with graphite were used as braid fibers in the regions of the centers of the polygon surface and aramid filaments were used in the region of the polygon corners.

For larger sealing cross sections, especially seals that consist of a core material and a braid, and especially for closed sealing rings, this braid technique, as described, e.g., in EP 0 741 807 B1, leads only under certain circumstances to the desired result, and at best up to a maximum operating temperature of 300° C.

Starting from these conditions, one object of the invention is forming an endless sealing ring for end-wall seals of rotary kilns for all operating temperatures, but especially for temperatures >400° C., such that for simpler assembly, a high degree of sealing effectiveness is guaranteed. Especially desired are small tolerances for cross section and diameter. According to the invention, rotary kiln end-wall seals should exhibit especially low wear and tear if possible and should have a service life that corresponds as much as possible to the maintenance intervals of the rotary kiln.

SUMMARY OF THE PRESENT INVENTION

To solve this problem, a rotary kiln with the features of claim 1, a sealing ring with the features of claim 14, and also a production method with the features of claim 16 are proposed. According to the invention, there is a core ring with a joint protected from tensile loads and the core ring is surrounded by an endless braid to form the desired final cross section. The dimensional accuracy and service life behavior is, further, significantly improved in that the endless braid has elongated shape-retention threads or fibers in the region of the polygon corners parallel to the circumferential direction of the ring. This latter feature is also assumed to have stand-alone inventive quality, independent of the joint formation.

Sealing rings according to the invention exhibit long service lives and better shape retention than could be previously realized.

It is now possible, in different ways, further to improve sealing rings according to the invention for rotary kilns relative to their core ring and joint formation and also relative to the endless cover.

The components that are used according to the invention and that are described above, in the claims, and in the embodiments, feature no special conditions in size, shape, material selection, and technical design, so that selection criteria known in the field of application can be used without restrictions.

Additional details, features, and advantages of the object of the invention result from the subclaims and also from the following description of the relevant drawing, which illustrates, as an example, a preferred embodiment of the rotary kiln according to the invention with an annular, closed end seal, an annular, closed seal for a rotary kiln, and also a method for producing such a seal. Shown in the drawing are:

BRIEF DESCRIPTION OF THE DRAWINGS

FIG. 1, a closed sealing ring according to the invention in top view;

FIG. 2, the same sealing ring in an axial section (section along line A—A from FIG. 1);

FIG. 3, just the core ring of the same sealing ring in axial section representation (from section A—A in FIG. 1);

FIG. 4A, a braided core ring cord in top view;

FIG. 4B, the same core ring cord in cross section;

FIGS. 5A–5C, the joint of the core ring from FIG. 3 in three different production stages;

FIG. 6A, a short circumferential section of a closed sealing ring in side view;

FIG. 6B, the same closed sealing ring in cross section, schematized, and also

FIG. 6C, the same closed sealing ring in cross section, partially schematized, and FIGS. 7a/b, a cutout from an end of a rotary kiln with installed closed sealing ring in end view (FIG. 7a) and axial section view (FIG. 7b).

PREFERRED EMBODIMENTS OF THE INVENTION

Figures 7A, 7B:
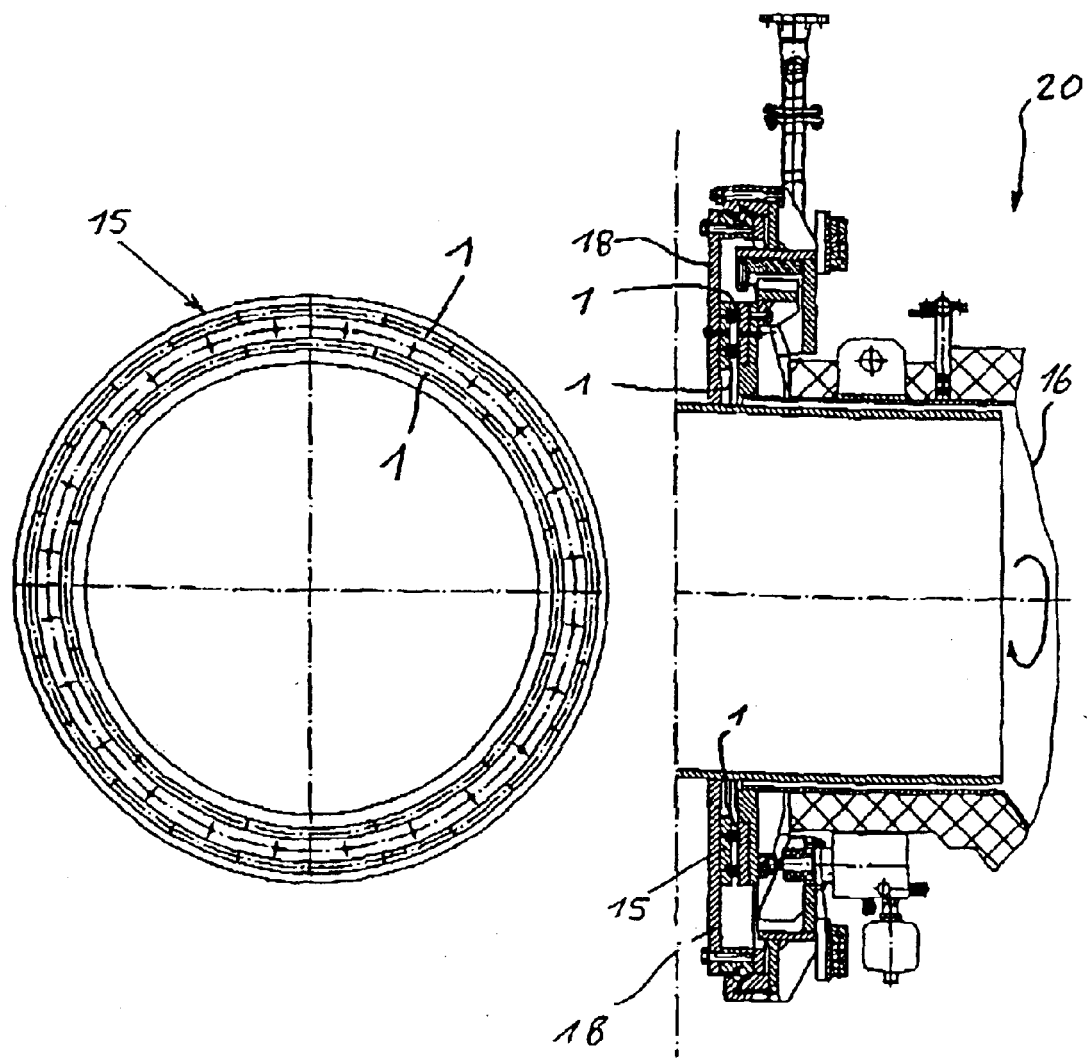

The sealing ring illustrated in top view in FIG. 1, from which an outside view of the outer endless braid layer can be seen, consists of a core ring 2 with joint 3 and a cover of the core ring 2 formed as an endless braid 10, as can be seen in FIGS. 2 and 3.

As can be seen especially in FIGS. 4A and 4B, the material of the core ring, which is present first as an endless cord and which preferably already has a polygonal cross section, can be a known braid, which consists of longitudinal fibers 4A and diagonal braid fibers 4B. Illustrated in the drawing and particularly preferred is a so-called four-track braiding of the core ring material. However, because the invention does not concern the making of the core material, the core ring is schematized in the remaining drawings, i.e., it is not shown as a braid.

From FIGS. 5A–5C, six steps for protecting the joint 3 of the core ring 2 from tensile loads can be seen: the joint 3 runs at an angle, preferably below 45°, to the rotating tube axis A. In order to prevent fraying of the interfaces, these can be coated with an adhesive. For the use of the seal in a rotary kiln, a high-temperature resistant adhesive, such as that marketed under the trade name of PATEX, can be used. Adhesive can also be used at the joint. For protecting the point of adhesion, this can be fixed, e.g., by winding a fiber-reinforced adhesive tape 14 around the joint (FIG. 5A). Then both sides of the joint 3 are anchored by tension-relieving threads 5, 6. This is preferably done, as shown in FIG. 5B, such that parallel seam threads arranged in the ring extension direction, i.e., in the direction of rotation, penetrate the core ring 2, especially at a right angle, on both sides of the joint 3. For the embodiment illustrated in FIG. 5B, circular threading is provided between opposing core ring surfaces. The tension-relieving threads are arranged in a double layer. First, a layer of carbon fibers 5, particularly made of double-threaded carbon fiber filaments, is threaded in the way described above. The preferred tensile strength of the carbon fiber threads is between 800 and 1400 N/m$^2$.

Then a second (outer) layer of tension-relieving threads 6 is threaded in the way described above. These preferably consist of aramid filaments, whose tensile strength is preferably between 2000 and 2900 N/m$^2$ per thread. In this way, tensile strength in the joint region of the core ring comparable to the core ring material is achieved so that a core ring of greater dimensional accuracy is produced. For a practical embodiment, core rings are produced in the four-track method with greater cross-sectional consistency of approximately 20×20 mm and a core-ring outer diameter of approximately 1.25 m, which has a tolerance better than or equal to 0.5% relative to the desired diameter.

In order to prevent thicker regions in the joint region, the tension-relieving threads 5, 6 are wound after the threading with the carbon fiber filaments (threading winding 7). Here, the tensile strength of the tension relief is also increased.

Usually, the threading of the tension-relieving threads is performed under high tension, wherein, e.g., 10 threads run horizontal and 10 threads run vertical through or along the core material. The second threading with aramid filaments is performed at conventional application temperatures, i.e., above 300° C. for additional joint adhesion by means of melting the aramid filaments.

The closed core ring produced in this way is then braided in the endless method. In this way, the sealing cross section receives the desired final dimensions. Despite this braiding, for which the braid threads necessarily run diagonal to the sealing circumference, no bulges appear and the core ring retains its dimensional accuracy. The two braiding layers are designated 10a and 10b in FIGS. 6A–6C. Along the polygon corners, shape-retaining threads or fibers 8 are tensioned. These are encompassed/embraced—together with the core ring or with an already made braid 10a from the subsequent endless braiding. In this way, a tensile force is exerted on the shape-retaining threads, which is, preferably, higher than the tensile force acting on the braid threads. In FIGS. 6B and 6C, the layer and the cross section of the shape-retaining threads 8 are illustrated only schematically for reasons of clarity. By means of the shape-retaining threads, the desired polygonal cross section is maintained for the endless braiding and the braiding is reinforced for tension. In this way, it was achieved that as a whole not only can the desired cross section resulting from the braiding be maintained with higher accuracy, but also the sealing ring diameter maintains the above-mentioned tolerance at better than or equal to 0.5%.

From FIGS. 7a/b, the rotating tube 16 of a known rotary kiln 20 can be seen. This tube contacts two closed sealing rings 1 according to the invention on the left rotating end surface. These rings have a coaxial and coplanar arrangement and are held in the circular grooves of a sealing carrier ring 15 with matching cross section on a stationary end wall 18 so that the sealing carrier ring does not rotate.

As a whole, a sealing ring for rotary kilns with greater dimensional accuracy and less wear and tear is produced by the invention.

For improvement of the dimensional accuracy, the sealing ring can be calendered between individual operating steps. The braid fibers are spliced at the end with the existing braid in order to keep the cross-sectional differences as small as possible.

| List of reference symbols | |
| --- | --- |
| 1 | Closed sealing ring |
| 2 | Core ring |
| 3 | Joint |
| 4 | Braid |
| 4a | Longitudinal fibers |
| 4b | Braid fibers |
| 5 | Tension-relieving threads |
| 6 | Tension-relieving threads |
| 7 | Threading winding |
| 8 | Shape-retaining threads |
| 10 | Endless braid |
| 10a | First braid layer |
| 10b | Second braid layer |
| 14 | Fixing tape |
| 15 | Sealing carrier ring |
| 16 | Rotating tube |
| 18 | End wall |
| 20 | Rotary kiln |

We claim:

1. Rotary kiln with at least one annular closed end seal between a revolving tube (16) and at least one stationary end wall (18), wherein one or more of said closed sealing rings comprises:
    a core ring (2) that has a polygonal cross section, said core ring comprising a a joint (3);
    a cover formed as an endless braid (10) surrounding the core ring (2); and,
    means for relieving tension in said core ring at said joint so that said core ring is protected from tensile loads in the zone of said joint (3).

2. Rotary kiln according to claim 1, wherein said means for relieving tension comprises tension-relieving threads or fibers (5, 6) extending in the ring circumferential direction and anchored on opposite sides of the joint.

3. Rotary kiln according to claim 2, wherein the tension-relieving threads (5) comprise double-threaded, carbon fiber filaments, with a tensile strength of 800–1400 N/m$^2$ per thread.

4. Rotary kiln according to claim 2, wherein the tension-relieving threads (5, 6) are arranged in a double layer.

5. Rotary kiln according to claim 4, wherein the tension-relieving threads (6) of an outer, second layer comprise aramid filaments, with a tensile strength of 2000–2900 N/m$^2$ per thread.

6. Rotary kiln according to claim 2, wherein the core-ring cross section is wound with the tension-relieving threads, especially with carbon fiber filaments (7) at least in the peripheral region of the tension-relieving threads (5, 6).

7. Rotary kiln according to claim 2, wherein said joint (3) of said core ring (2) is fixed by adhesive.

8. Rotary kiln according to claim 2, wherein the endless braid (10) comprises shape-retaining threads or fibers (8) in the region of edges of said polygonal cross section of said core ring and extending parallel to the ring circumferential direction.

9. Rotary kiln according to claim 1, wherein said joint (3) of said core ring (2) is fixed by adhesive.

10. Rotary kiln according to claim 9, wherein the tension-relieving threads (5) comprise double-threaded, carbon fiber filaments, with a tensile strength of 800–1400 N/m$^2$ per thread.

11. Rotary kiln according to claim 9, wherein the tension-relieving threads (5, 6) are arranged in a double layer.

12. Rotary kiln according to claim 1, wherein said means for relieving tension comprises seam threads running in the ring circumferential direction, which penetrate the core ring (2) on both sides of the joint (3).

13. Rotary kiln according to claim 12, wherein said seam threads extend in parallel with each other.

14. Rotary kiln according to claim 1, wherein the endless braid (10) has shape-retaining threads or fibers (8) in the region of edges of the polygonal cross-section and extending parallel to a circumference of the core ring.

15. Rotary kiln according to claim 14, wherein the endless braid (10) is two-layered.

16. Rotary kiln according to claim 14, wherein the thread or fiber ends of the endless braid (10) are spliced with the braid.

17. Rotary kiln according to claim 14, wherein the joint surface of the core ring (2) runs at an angle below 45° to the rotating tube axis.

18. Rotary kiln according to claim 1, wherein the endless braid (10) is two-layered.

19. Rotary kiln according to claim 1, wherein the thread or fiber ends of the endless braid (10) are spliced with the braid.

20. Rotary kiln according to claim 1, wherein the joint surface of the core ring (2) runs at an angle below 45° to the rotating tube axis.

21. Annular, closed seal for the end seal of a rotary kiln (20) between a rotating tube (16) and stationary end walls (18), said closed seal comprising a core ring that has a polygonal cross section with joint in said core ring and a cover over the core ring formed as an endless braid, wherein the joint (3) of the core ring (2) is fixed with an adhesive and protected from tension by tension-relieving threads or fibers (5, 6) extending in the ring circumferential direction and anchored on both sides of the joint.

22. Sealing ring according to claim 21, wherein the joint of the core ring is protected from tension by seam threads running in the ring circumferential direction, which penetrate the core ring (2) on both sides of the joint (3).

23. A rotary kiln comprising:

a revolving tube;

a stationary end wall;

at least one annular closed end seal located between the revolving tube and the stationary end wall, said at least one annular closed end seal comprising: (i) a core ring that has a polygonal cross and a joint; and, (ii) a cover comprising an endless braid surrounding the core ring, wherein said core ring is protected from tensile loads in a zone of said joint by material spanning said joint and anchored on opposite sides of said joint.

24. The rotary kiln as set forth in claim 23, wherein said material spanning said joint comprises:

tension-relieving threads or fibers anchored on both sides of the joint.

* * * * *